United States Patent

Sung

Patent Number: 5,356,237
Date of Patent: Oct. 18, 1994

[54] EXPANDABLE HANDLES OF WALK-AIDING WHEELED FRAME

[76] Inventor: Jung T. Sung, No. 30 Lane 154, Ta-Chain Str., Taichung, Taiwan

[21] Appl. No.: 992,020

[22] Filed: Dec. 17, 1992

[51] Int. Cl.$^5$ .............................................. B60D 3/00
[52] U.S. Cl. ...................... 403/374; 403/20; 403/82; 403/87; 403/110; 403/320; 403/341; 403/383; 403/DIG. 9; 280/1.5; 280/490.1
[58] Field of Search ............... 403/374, 383, 409.1, 403/DIG. 9, 80, 87, 110, 341, 320, 19, 20, 355, 92; 280/481, 490.1, 1.5

[56] References Cited

U.S. PATENT DOCUMENTS 2,603,495 7/1952 Hermanson ................. 403/374 X

*Primary Examiner*—Randolph A. Reese
*Assistant Examiner*—Christopher J. Novosad

[57] ABSTRACT

A walk-aiding wheeled frame comprises base tubes, handle tubes, and fastening devices. The connecting portions of the base tube and the handle tube are polygonal in their cross sections. The base tube is provided with a locking slot. The fastening device comprises a pressing baffle capable of being driven to move by a wrench, and a hexagonal fastening tube provided with a locking baffle corresponding in location to the locking slot of the base tube. The handle tube and the base tube are fastened securely in an end-to-end manner by means of the pressing baffle, which is driven by the wrench to move inwards, and of the locking baffle. Such method of fastening the base tube and the handle tube ensures that the handle tube does not become loosely attached, thereby safeguarding the user of the walk-aiding wheeled frame.

3 Claims, 7 Drawing Sheets

A-A

EXPANDABLE HANDLES OF WALK-AIDING WHEELED FRAME

BACKGROUND OF THE INVENTION

The present invention relates to a device used by a crippled parson as an aid in walking, and more particularly to improved structures of expandable handles of a walk-aiding wheeled frame. The present invention makes use of Hexagonal tubes in place of round tubes of the prior art which are vulnerable to becoming loose. In addition, the present invention makes use of an improved clamping means, which is disposed at the junction between an inner tube and an outer tube so as to take a fast hold of the inner and the outer tubes.

The FIG. 1 shows a walk-aiding wheeled frame of the prior art, which is used as an aid in walking by an old person who is crippled or a patient who is recuperating. Such prior art device is provided with a bottom frame 10 to which two handles 11 are attached. Each of the two handles 11 serves as a guard or support to be held by the hand of a user of the device. The handles 11 are expandable and can be adjusted upwards or downwards as desired to suit the need of a user in respect of the user's height. Each of the handles 11 is composed of an inner round tube 12 fitted into an outer round tube 13 which is provided with a fastening slot 131 and a fastening ring 14, as shown in FIG. 2. The fastening ring 14 is fitted over the outer round tube 13, which is in turn fitted over the inner round tube 12. The fastening ring 14 is used to keep a tight Hold on the outer round tube 13 and the inner round tube 12. The prior art handles 11 described above have the following shortcomings:

(1). The method, by which the inner round tube 12 and the outer round tube 13 are fastened together, is defective in design in that the inner round tube 12 is vulnerable to becoming loose as a result of the handle 11 being exerted upon by a force of the hand of the user holding the handle 11. The inner round tube 12 is therefore prone to turn, thereby causing the user of the device to become so panicked as to trip.

(2). It takes a great deal of physical strength to tighten or unfasten the fastening ring 14 of the prior art, as shown in FIG. 2. Such fastening ring of a poor design is a physical burden to a crippled person who uses the device.

(3). The prior art fastening means includes a fastening ring 14, which is used to clamp the outer round tube 13 which in turn takes a hold of the inner round tube 12. In other words, the inner round tube 12 is fastened in an indirect manner by the fastening ring 14. Such fastening method is unreliable and should be therefore improved.

(4). The prior art wheeled frame is provided with hand grips 15, which are of a circular construction and are so dimensioned as to fit over the inner round tubes 12. The vulnerability of such hand grips 15 to becoming loose and thus to turning is substantially increased. Consequently, a user of such a prior art device is subjected to an accident.

SUMMARY OF THE INVENTION

It is therefore the primary objective of the present invention to provide a walk-aiding frame, which is made up of polygonal tubes in place of round tubes so as to ensure that the tubes making up the frame are fastened securely in place.

It is another objective of the present invention to provide a walk-aiding frame with a safety feature, which comprises an improved clamping means capable of taking respectively and directly a fast hold of the inner tube and the outer tube.

In keeping with the principles of the present invention, the foregoing objectives of the present invention are accomplished by a walk-aiding wheeled frame, which comprises mainly base tubes, handle tubes, and fastening devices. The connecting portions of both base tube and handle tube are of hexagonal construction. The base tube is provided with a locking slot. The fastening device comprises a pressing baffle capable of being driven to move by a wrench, and a hexagonal fastening tube provided with a locking baffle corresponding in location to the locking slot of the base tube. The handle tube and the base tube are fastened securely in place by means of the pressing baffle, which is driven by the wrench to move inwards, and of the locking baffle.

DETAILED DESCRIPTION OF THE INVENTION

Figure 1:
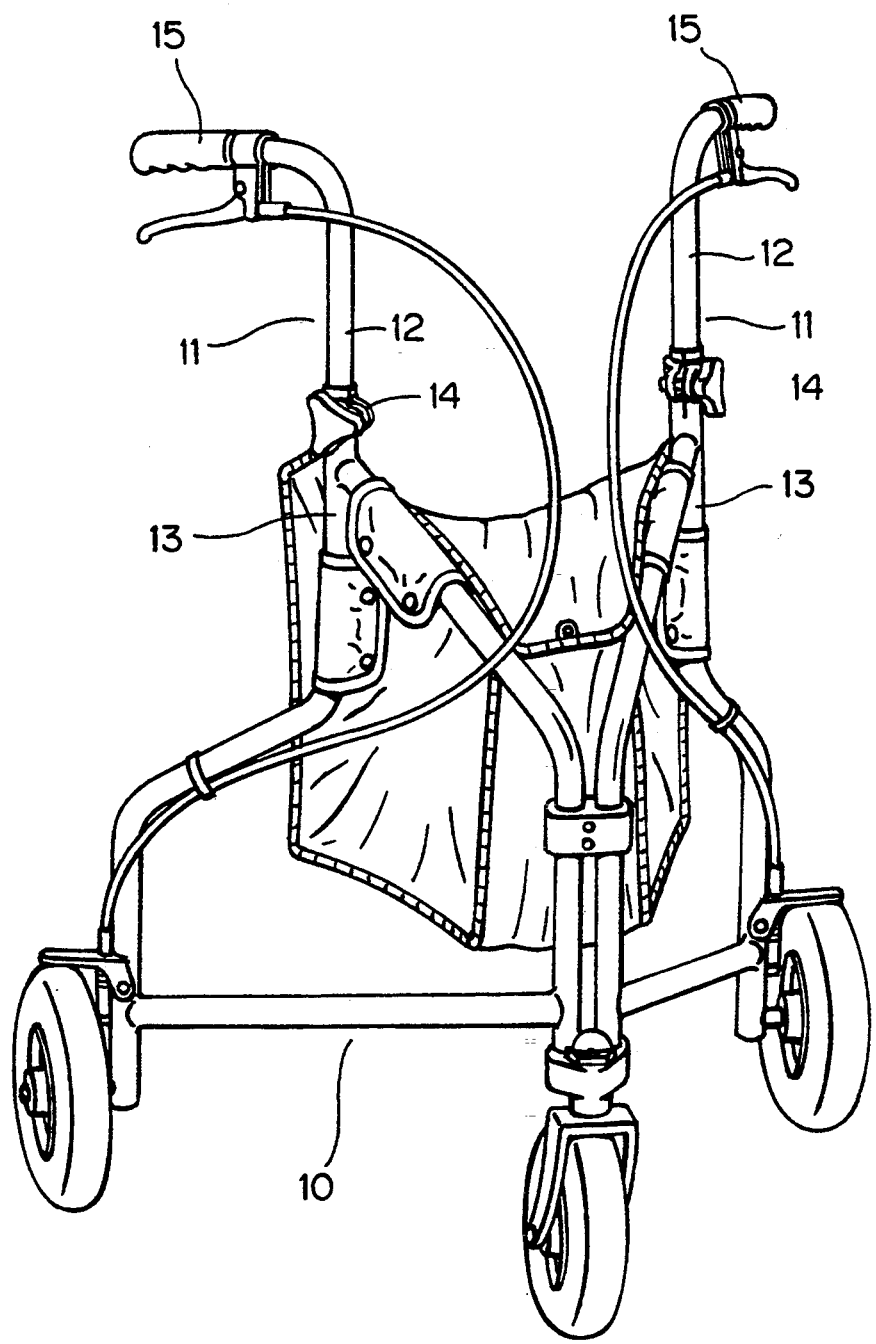
FIGS. 1 shows a perspective view of a walk-aiding wheeled frame of the prior art.
Figure 2:
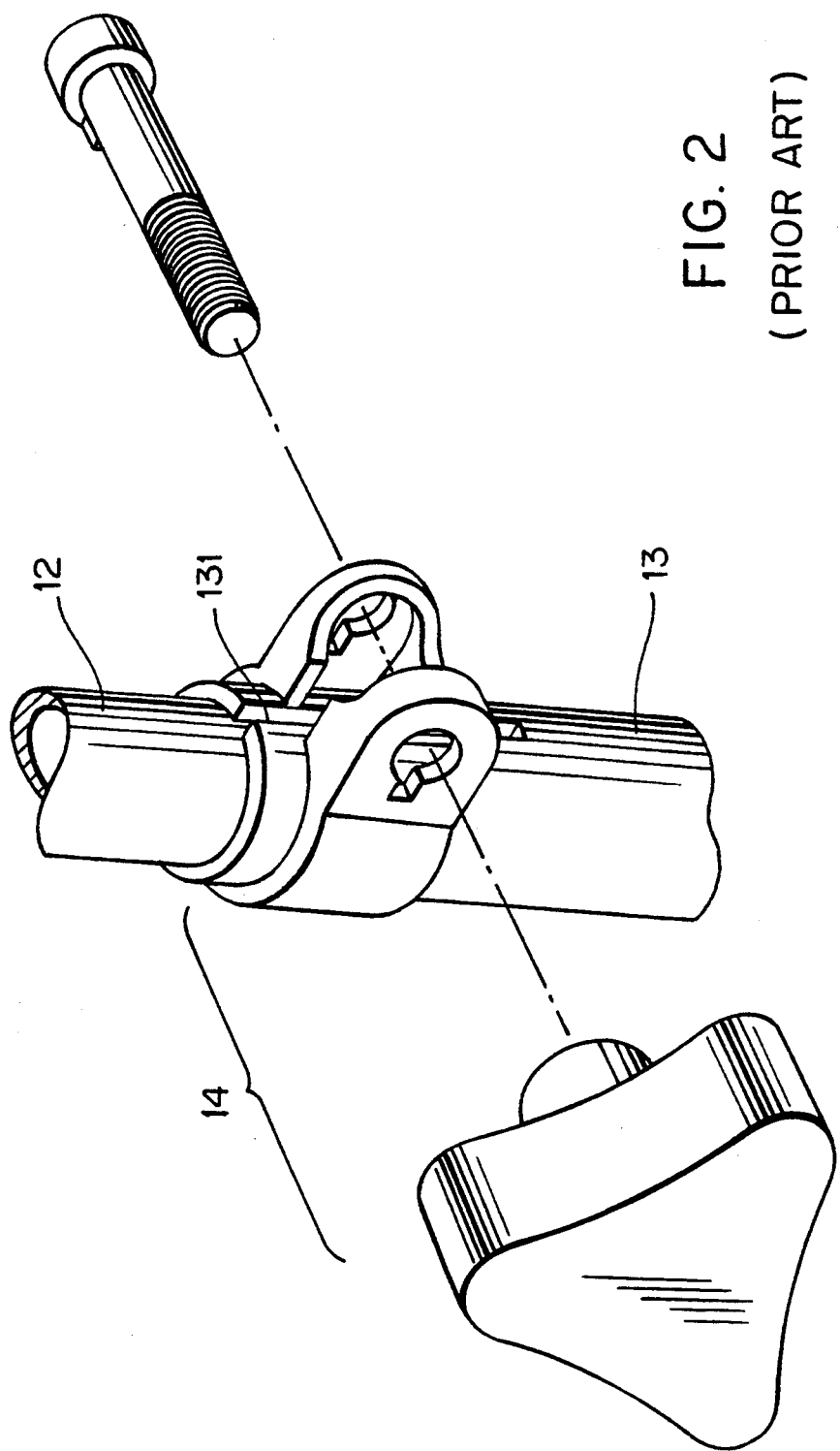
FIG. 2 shows an exploded view of a fastening device of the walk-aiding wheel frame as shown in FIG. 1.
Figure 3:
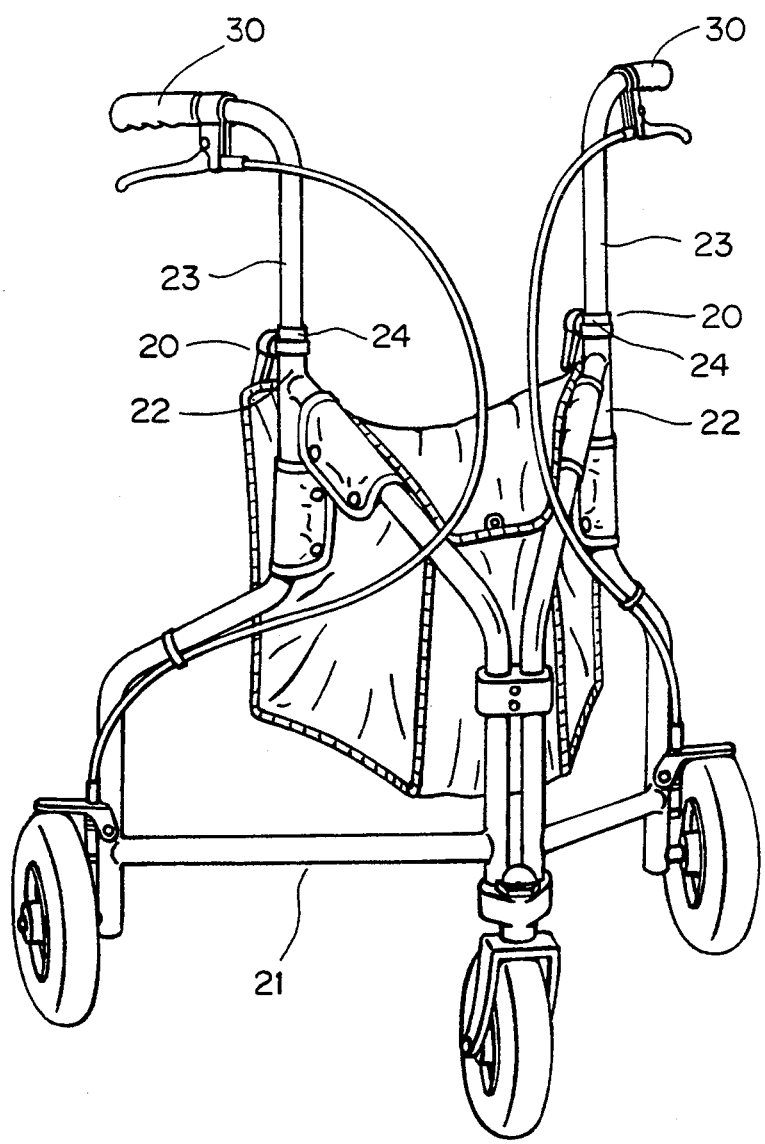
FIG. 3 shows a perspective view of a walk-aiding wheeled frame of the present invention.
Figure 4:
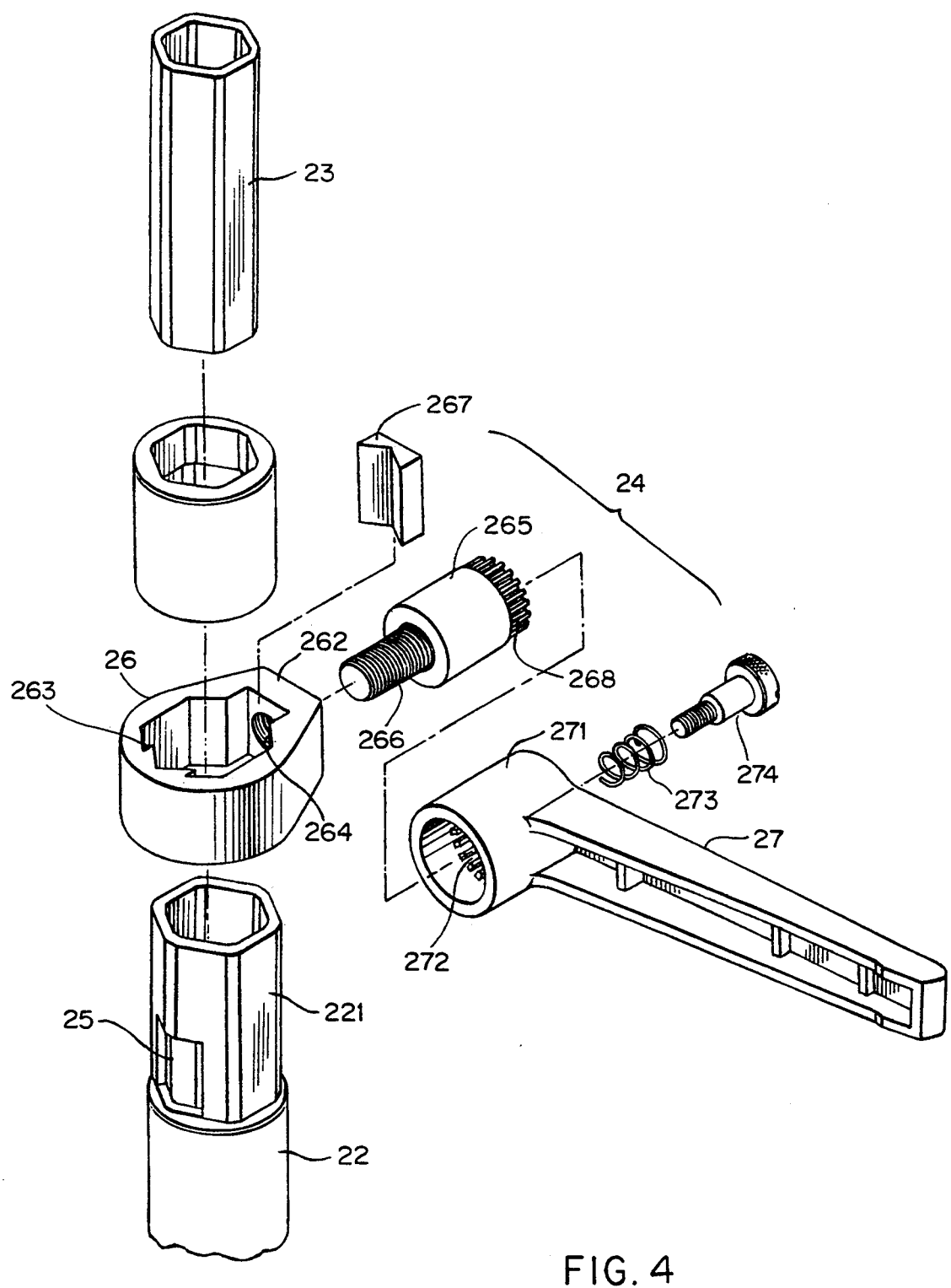
FIG. 4 shows an exploded view of a fastening device of the present invention.
Figure 7A:
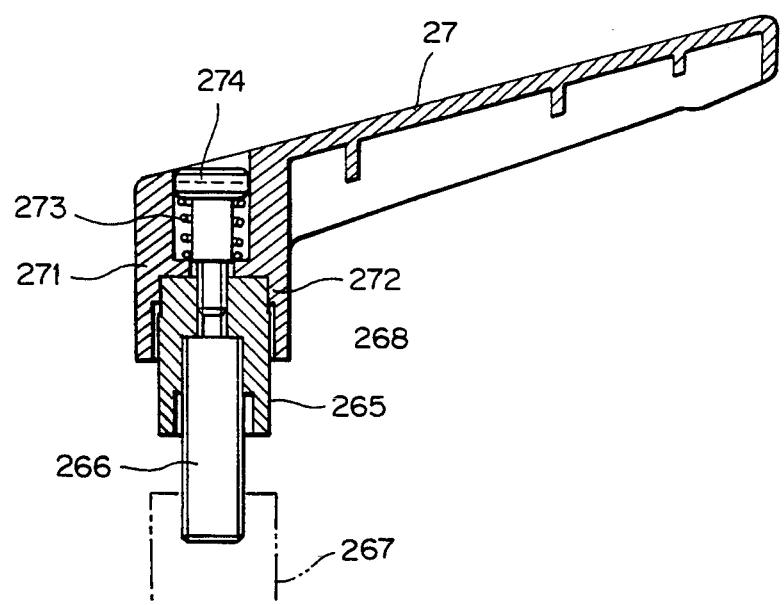
FIGS. 7A and 7B show schematic views of a wrench in action, which works to fasten and unfasten the fastening device as shown in FIG. 4.
Figure 7B:
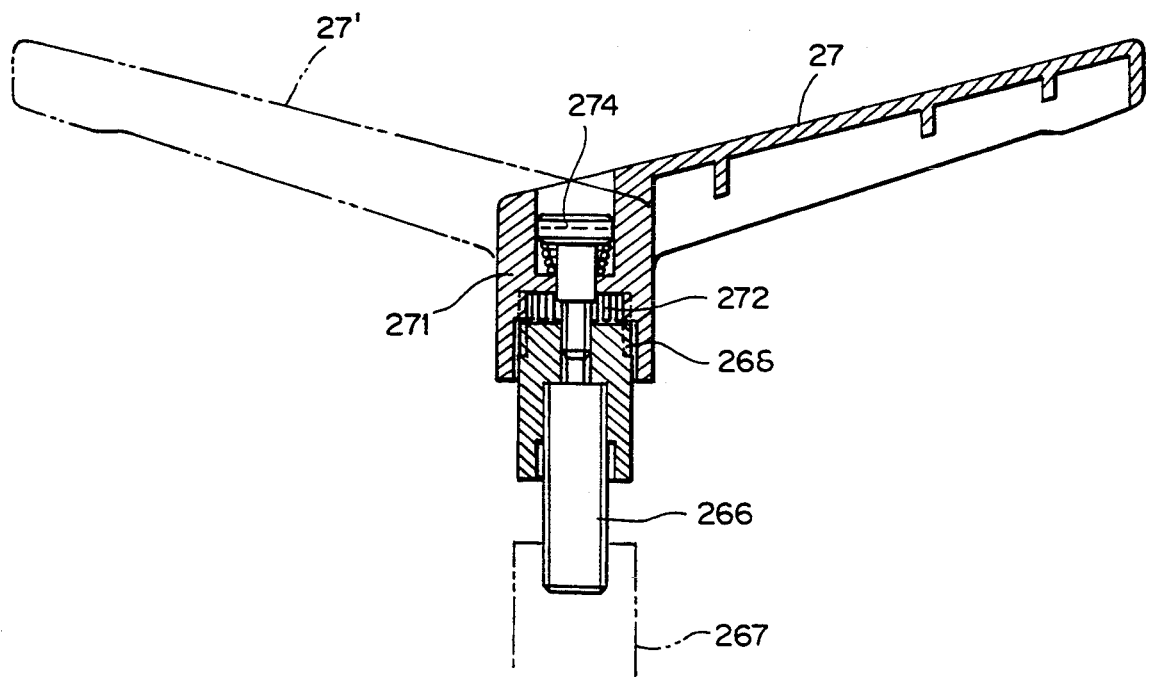

Referring to FIGS. 3 and 4, a walk-aiding wheeled frame of the present invention is shown to comprise mainly two base tubes 22, two handle tubes 23, and a fastening device 24. The two base tubes 22 are attached securely to a bottom frame 21. The handle tube 23 is the main component of an expandable handle 20. The fastening device 24 is disposed at the junction between the base tube 22 and the handle tube 23. The base tube 22 is provided with a connecting portion 221 having a hexagonal cross section. The connecting portion 221 has a locking slot 25 situated at an appropriate location thereof. The handle tube 23 is also hexagonal in its cross section. The fastening device 24 has a hexagonal fastening tube 26 provided with a fastening slot 261 of a polygonal construction and with a threaded base 262 corresponding in location to a wrench 27. The fastening tube 26 is further provided with a locking baffle 263 opposite to the threaded base 262 having a threaded hole 264 engageable with a threaded tail 266 of a rotor 265 having an internally threaded and externally splined head 268. The wrench 27 has a wrench head 271 containing a socket 272 dimensioned to fit over the externally splined head 268 of the rotor 265. In addition, the wrench head 271 is provided with a spring 273 and a bolt 274, which are arranged in the wrench head 271 in a manner that the bolt 274 is fastened to the externally splined threaded head 268 of the rotor 265. As shown in FIG. 7A, when the wrench 27 is rotated, the socket 272 of the wrench 27 imparts the rotational force of the wrench 27 to the externally splined head 268 of the rotor 265. As a result, the threaded tail 266 of the rotor 265 is deiven to move inwards to force the pressing baffle 267 to move likewise, so as to fasten securely the base tube 22 and the handle tube 23 simultaneously. On the other hand, when the wrench head 271 is pulled away from the threaded head 268 of the rotor 265 to an extent that the socket 272 of the wrench head 271 disengages the externally splined head 268 of the rotor 265, as shown in FIG. 7B, the wrench 27 is rotated so that the rotor 265 is turned oppositely to unfasten the base tube 22 and the handle tube 23 to facilitate the adjustment of the length of the handle tube 23.

Figure 5A:
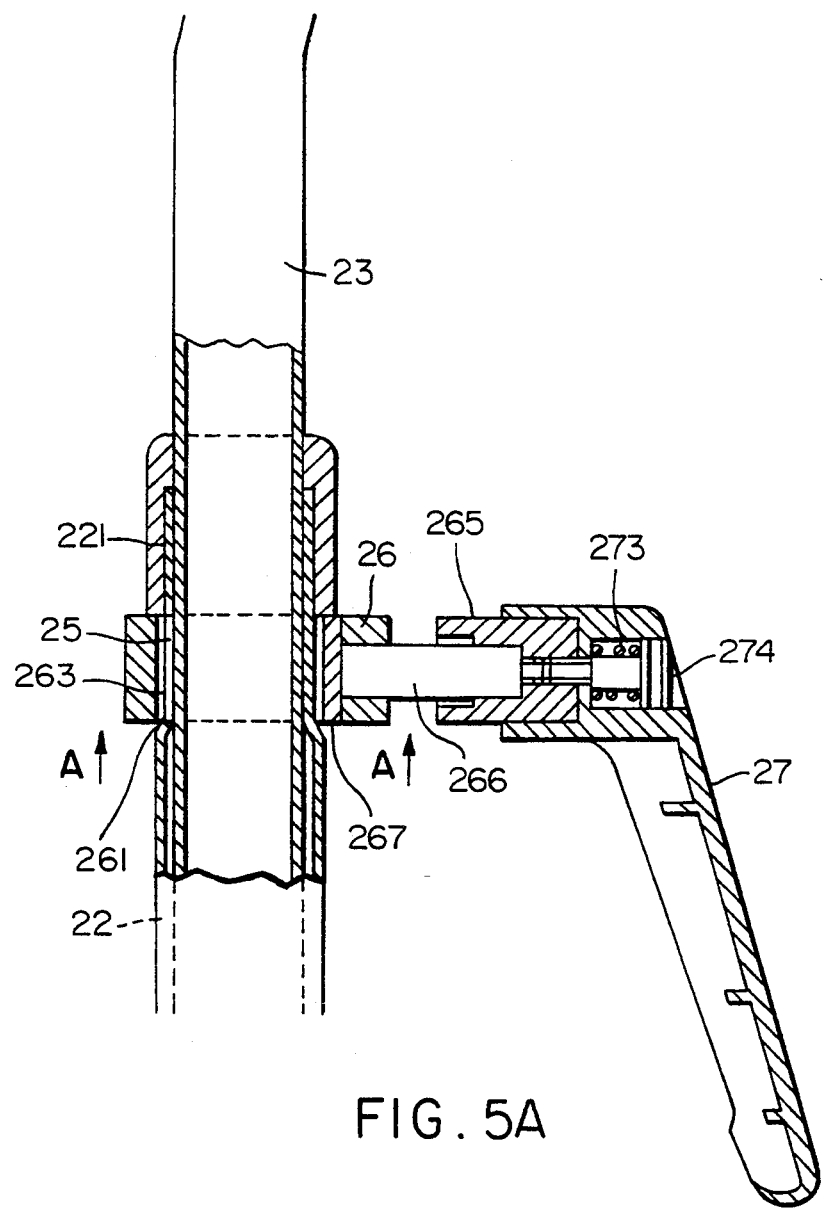
FIG. 5A, taken along line A—A of FIG. 5B and FIG. 5B are sectional schematic views showing the fastening device, as shown in FIG. 4 in a fastened state.
Figure 5B:
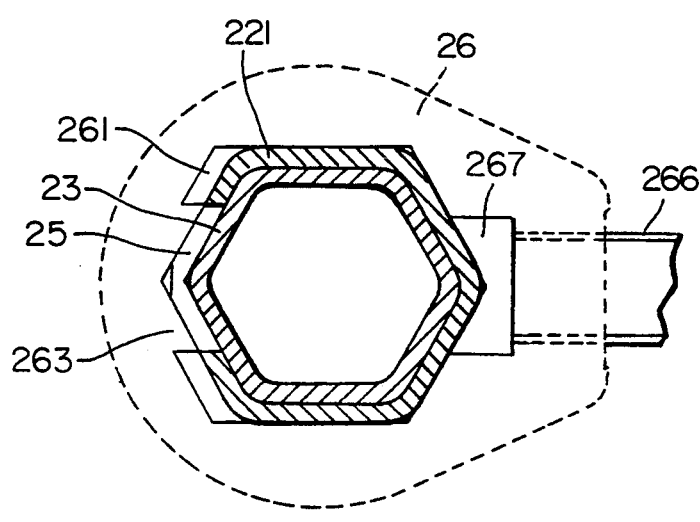
Figure 6A:
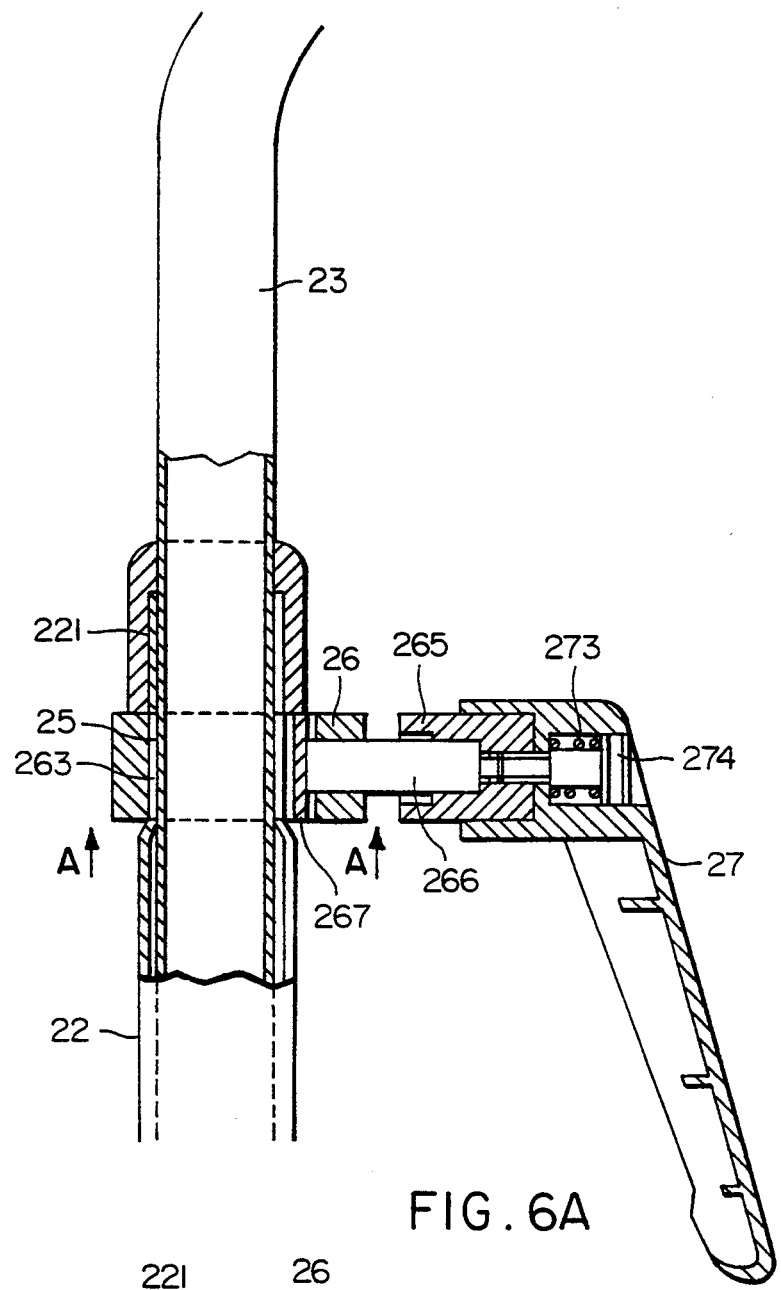
FIG. 6A, taken along line A—A of FIG. 6B and FIG. 6B are sectional schematic views showing the fastening device, as shown in FIG. 4, in a fastened state.
Figure 6B:
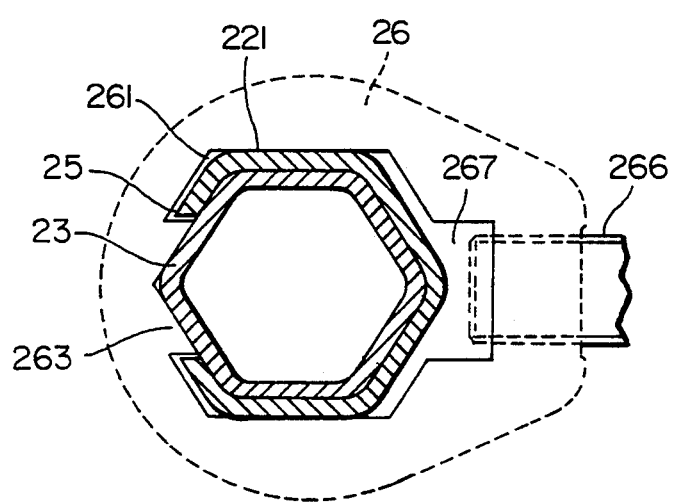

Upon the completion of the length adjustment of the handle tube 23, rotate the wrench 27 to drive the rotor 265, which in turn pushes the pressing baffle 267 to press forcibly against the connecting portion 221 of the base tube 22. As the rotation of the wrench 27 persists, the locking baffle 263 of the fastening tube 26 passes through the locking slot 25 to press against the outer wall of the handle tube 23, as shown in FIGS. 5 and 6. The direction in which the force presses against the base tube 22 is opposite to the direction in which the force presses against the handle tube 23. As a result, both base tube 22 and handle tube 23 are held together securely in place by the fastening device 24, without the risk of the base tube 22 and the handle tube 23 becoming loose. In other words, the fastening method of the present invention is different from the prior art method in that the base tube 22 and the handle tube 23 of the present invention are held directly by the pressing baffle 267 and the locking baffle 263 and that the base tube 22 and the handle tube 23 are polygonal in their cross sections so as to reinforce the fastening mechanism. The fastening method of the prior art is defective in that the inner tube is held by the force of the outer tube pressing against the inner tube and that both the inner and the outer tubes are circular in their cross sections. The prior art method often fails to hold securely the handle of the walk-aiding frame.

Figure 8:
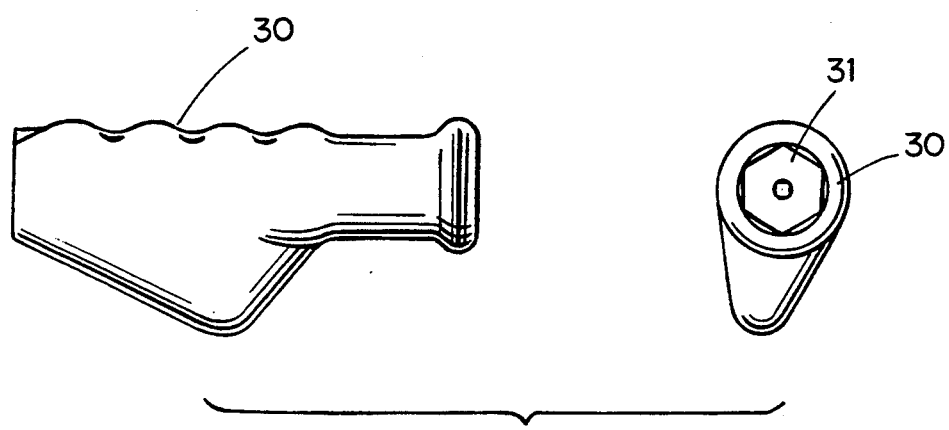
FIG. 8 shows a schematic view of a hand grip of the present invention.

The handle tube 23 of the present invention is provided at the upper end thereof with a hand grip 30 attached thereto. The hand grip 30 is similar in construction to the handle tube 23 in that it has a polygonal cross section 31, as shown in FIG. 8. Therefore, the hand grip 30 is attached securely to the handle tube 23, without the risk that the hand grip 30 becomes loosely attached.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the hereinafter appended claims.

What is claimed is:

1. Expandable handles of walk-aiding wheeled frame comprising a handle tube united in an end-to-end manner with a base tube attached securely to a bottom frame of said walk-aiding wheeled frame, with said handle tube and said base tube held securely together interfittingly by means of a fastening device, with said base tube provided with a connecting portion having a polygonal cross section and a locking slot, with said handle tube having a polygonal cross section similar to said polygonal cross section of said base tube; wherein said fastening device is characterized in that said fastening device has a fastening tube having a polygonal cross section, a fastening slot, and a threaded base having a threaded hole, and that said fastening slot is provided with a pressing baffle which can be driven to move by a threaded tail of a rotor fastened to said threaded base of said fastening device, with said rotor provided at an end thereof opposite to said threaded tail with a splined head engageable with a socket of a wrench, and further that said fastening tube of said fastening device comprises a locking baffle opposite to said pressing baffle.

2. The expandable handles of walk-aiding wheeled frame of claim 1 wherein said wrench comprises a wrench head provided with a socket, a spring, and a bolt by which said wrench head of said wrench is fastened to said splined head of said rotor.

3. The expandable handles of walk-aiding wheeled frame of claim 1 wherein said handle tube is provided at an end thereof with a hand grip having a polygonal cross section.

* * * * *